United States Patent
Harris et al.

(10) Patent No.: US 6,246,810 B1
(45) Date of Patent: Jun. 12, 2001

(54) METHOD AND APPARATUS FOR CONTROLLING TIME DELAY IN OPTICAL SLIP RINGS

(75) Inventors: Michael H. Harris; Glenn F. Dorsey, both of Blacksburg; Lee E. Barker, Christiansburg; Linda W. Vick, Blacksburg, all of VA (US)

(73) Assignee: Electro-Tec Corp., Blacksburg, VA (US)

( * ) Notice: Subject to any disclaimer, the term of this patent is extended or adjusted under 35 U.S.C. 154(b) by 0 days.

(21) Appl. No.: 09/333,549

(22) Filed: Jun. 16, 1999

Related U.S. Application Data

(60) Provisional application No. 60/089,405, filed on Jun. 16, 1998.

(51) Int. Cl.[7] ..................................................... G02B 6/26
(52) U.S. Cl. ............................. 385/26; 385/25; 359/154; 359/173; 356/459
(58) Field of Search ..................... 385/26, 25; 356/459; 359/154, 173

(56) References Cited

U.S. PATENT DOCUMENTS

| | | |
|---|---|---|
| 4,027,945 | 6/1977 | Iverson . |
| 4,092,061 | 5/1978 | Stigliani, Jr. . |
| 4,109,997 | 8/1978 | Iverson . |
| 4,259,584 | 3/1981 | Krumme . |
| 4,278,323 | 7/1981 | Waldman . |
| 4,299,609 | 11/1981 | Aulich et al. . |
| 4,323,292 | 4/1982 | Lewis et al. . |
| 4,329,004 | 5/1982 | Lewis . |
| 4,355,863 | 10/1982 | Aulich et al. . |
| 4,398,113 | 8/1983 | Lewis et al. . |
| 4,407,668 | 10/1983 | Aulich et al. . |
| 4,436,367 | 3/1984 | Lewis et al. . |
| 4,444,459 | 4/1984 | Woodwell . |
| 4,466,695 | 8/1984 | Kruger . |
| 4,472,052 | 9/1984 | Löfgren . |

(List continued on next page.)

FOREIGN PATENT DOCUMENTS

| | | |
|---|---|---|
| 2846526 | 6/1987 | (DE) . |
| 19543386 | 3/1997 | (DE) . |
| 19543387 | 3/1997 | (DE) . |
| 19543385 | 6/1997 | (DE) . |
| 0059891 | 9/1982 | (EP) . |
| 0766890 | 11/1998 | (EP) . |
| 0184101 | 10/1983 | (JP) . |
| 0292919 | 11/1989 | (JP) . |
| 0024609 | 1/1990 | (JP) . |
| 9719529 | 5/1997 | (WO) . |
| 9800935 | 1/1998 | (WO) . |
| 9800936 | 1/1998 | (WO) . |
| 9904309 | 1/1999 | (WO) . |
| 9918463 | 4/1999 | (WO) . |

*Primary Examiner*—Hemang Sanghavi
*Assistant Examiner*—Sung Pak
(74) *Attorney, Agent, or Firm*—Price, Heneveld, Cooper, DeWitt & Litton

(57) ABSTRACT

An optical slip ring system provides for the transfer of information between a rotating frame and a stationary frame. The optical slip ring system includes a modulated light source, an optical fiber ring for receiving modulated light from the modulated light source and a signal conditioner. The modulated light source is attached to either the rotating frame or the stationary frame. The optical fiber ring is attached to the opposite frame. The optical fiber ring includes a first optical fiber and a second optical fiber. The first and second optical fibers each include a first and second end. The first end of the first optical fiber is coupled to a first terminator and the second end of the first optical fiber is coupled to a detector. The first end of the second optical fiber is coupled to a second terminator and the second end of the second optical fiber is coupled to the detector. The signal conditioner is coupled to the detector and restores data edges of the transferred information using an external clock.

13 Claims, 1 Drawing Sheet

U.S. PATENT DOCUMENTS

| | | |
|---|---|---|
| 4,492,427 | 1/1985 | Lewis et al. . |
| 4,525,025 | 6/1985 | Hohmann et al. . |
| 5,029,336 | 7/1991 | Micheron et al. . |
| 5,054,189 | 10/1991 | Bowman et al. . |
| 5,121,419 | 6/1992 | Micheron et al. . |
| 5,140,289 | 8/1992 | Andrieu et al. . |
| 5,229,871 | 7/1993 | Czarnek et al. . |
| 5,285,512 | 2/1994 | Duncan et al. . |
| 5,297,225 | 3/1994 | Snow et al. . |
| 5,336,897 | 8/1994 | Watanabe et al. . |
| 5,436,988 | 7/1995 | Narendran . |
| 5,455,703 | 10/1995 | Duncan et al. . |
| 5,535,033 * | 7/1996 | Guempelein et al. ............... 359/144 |
| 5,541,759 * | 7/1996 | Neff et al. ............................ 359/152 |
| 5,991,478 * | 11/1999 | Lewis et al. .......................... 385/26 |

* cited by examiner

METHOD AND APPARATUS FOR CONTROLLING TIME DELAY IN OPTICAL SLIP RINGS

This application claims priority based on U.S. Provisional Patent Application Serial No. 60/089,405 entitled, "METHOD AND APPARATUS FOR CONTROLLING TIME DELAY IN OPTICAL SLIP RINGS", by Glenn F. Dorsey, Michael H. Harris, Lee E. Barker and Linda W. Vick, filed Jun. 16, 1998, the disclosure of which is hereby incorporated by reference.

BACKGROUND OF THE INVENTION

Slip rings are used to transmit electrical signals across rotating joints. In conventional slip rings, the signals are carried across the rotating interface by precious metal alloys or composite brushes, which maintain contact with precious metal plated rings. Data transmission rates are limited by discontinuities at the contacts. Non-contact slip rings are used when higher data transmission rates are required which exceed the capability of the contacting slip rings.

SUMMARY OF THE INVENTION

An embodiment of the present invention is directed to an optical slip ring system for transferring information between a rotating frame and a stationary frame. The optical slip ring system includes a modulated light source, an optical fiber ring for receiving modulated light from the modulated light source and a signal conditioner for removing time variations in the transferred information. In one embodiment, the modulated light source is attached to the rotating frame. In that embodiment, the optical fiber ring is attached to the stationary frame. The optical fiber ring includes a first optical fiber and a second optical fiber. The first and second optical fibers each have a first and second end. In one embodiment, the first end of the first optical fiber is coupled to a first terminator and the second end of the first optical fiber is coupled to a detector. In that embodiment, the first end of the second optical fiber is coupled to a second terminator and the second end of the second optical fiber is coupled to the detector. The signal conditioner is coupled to the detector and restores data edges of the transferred information using an external clock. An advantage of the disclosed invention is that it reduces discontinuity in a received signal which allows for easier time delay correction of the received signal.

These and other features, advantages and objects of the present invention will be further understood and appreciated by those skilled in the art by reference to the following specification, claims and appended drawings.

DETAILED DESCRIPTION OF PREFERRED EMBODIMENT

In some applications, off axis fiber optic slip rings are used to achieve higher data rates than are possible with contacting slip rings. Digital data is transmitted between the rotating and stationary portions of the slip ring by coupling light pulses into the side of a fiber ring. One of the difficulties encountered with optical slip rings is the varying time delay from between when the signal is injected into the fiber and when it reaches the detector(s).

FIG. 1 illustrates a simple off axis optical slip ring with single light source and a single detector. Light is injected from a source, which rotates relative to the fiber ring. One end of the fiber is terminated in such a way that light is absorbed and the signal does not continue to travel through the ring. A detector is placed at the other end of the fiber to receive the signals transmitted from the light source.

Figures 1A, 1B:
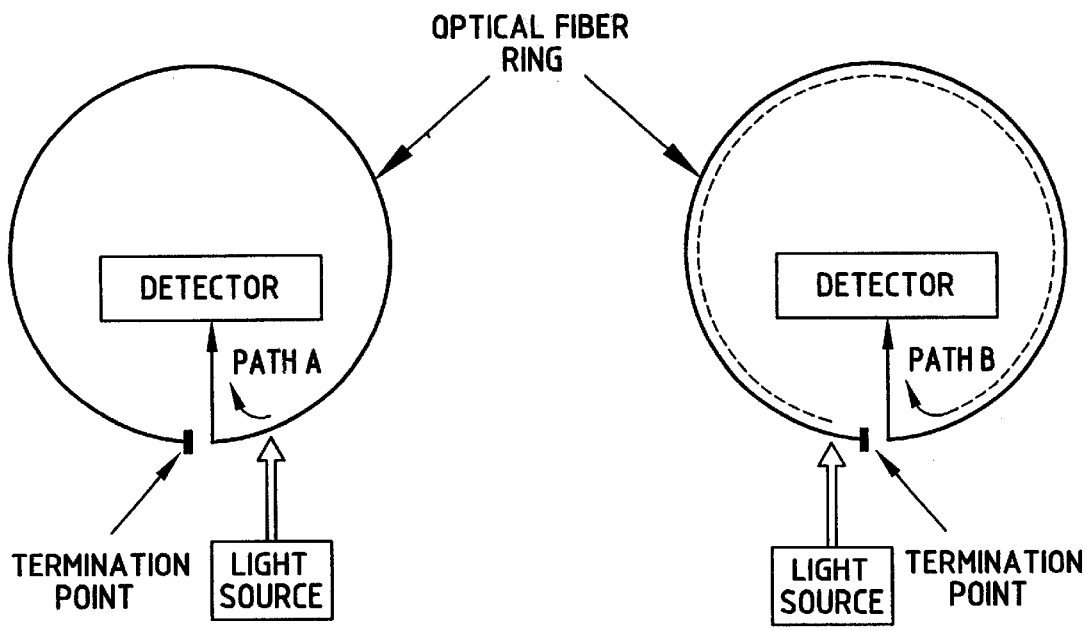
FIGS. 1a–b show an optical fiber ring implemented with a single fiber.

A discontinuity in the time delay of the detected signal occurs as the slip ring is rotated so that the source moves across the termination point. When the source is on the detector side of the termination gap, as shown in FIG. 1a, the time delay is nearly zero, because the path length between the source and the detector is very short through path A. However, as the slip ring continues to rotate, the source reaches the other side of the termination point, where light must pass all the way around the fiber to reach the detector, through path B, as shown in FIG. 1b. The signal time delay jumps from nearly zero to its maximum.

In large slip rings currently used for medical equipment, the diameter of the slip ring can be as much as 1.4 meters (55 inches). For a fiber with a refractive index of 1.5, a jump in the time delay of approximately 22 nanoseconds would be experienced at the termination point. For data rates of 200 megabits/second, the time between data bits is only 5 nanoseconds. This would result in a loss of 4–5 bits per revolution.

From this example, it is evident that if corrections for this discontinuity in time delay are not made, error-free data transmission rates will be severely limited. The invention described in this document is a method of controlling the time delay in an optical slip ring. It consists of two parts: (1) splitting the fiber ring into two halves, to remove the discontinuity in the time delay, and (2) electronically altering the received signal to account for the variation in time delay with rotational position.

FIG. 2 is a sketch of an optical slip ring with a split fiber ring. Rather than having a single fiber, there are two distinct fibers. Each has its own termination point, where light is absorbed, at the same location on the slip ring. Light is received at the other end of the single fibers, either by a shared or an individual detector.

Figures 2A, 2B:
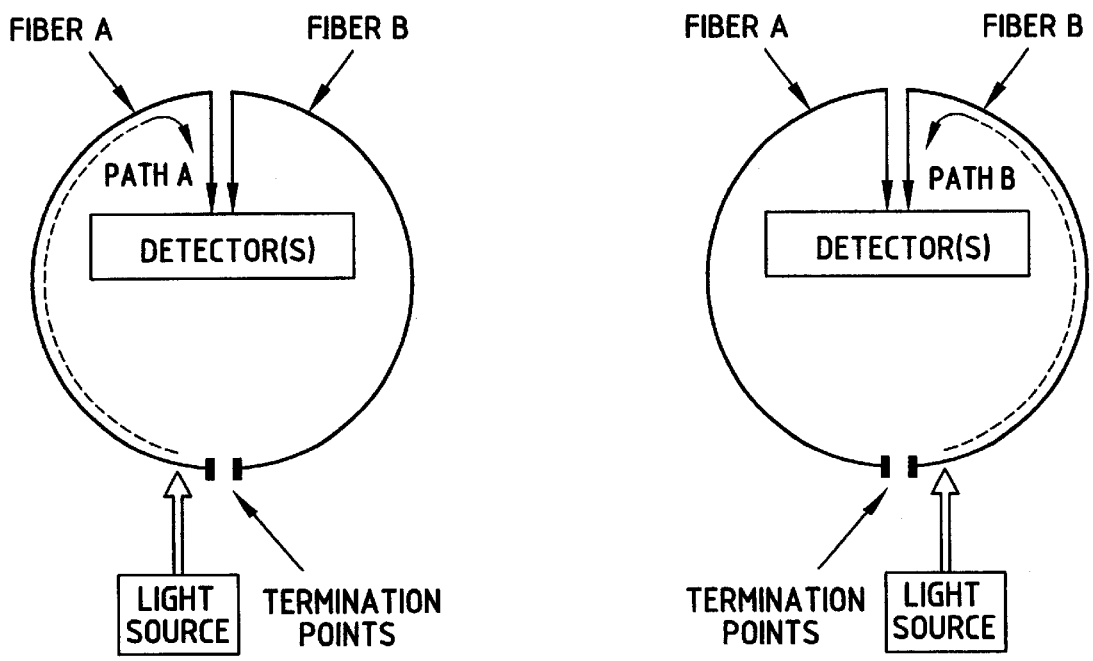
FIGS. 2a–b depict an optical fiber ring, according to an embodiment of the present invention, implemented with two fibers of approximately equal length.

When the slip ring is rotated so that the source moves across the termination point, the positions shown in FIGS. 2a and 2b, the light reaches the detector with a continuous time delay. In FIG. 2a, the light reaches the detector through path A. Light traveling through the fiber in the other direction is absorbed at the termination point. When the slip ring is rotated slightly to the position in FIG. 2b, the light reaches the detector through path B. Paths A and B are approximately the same length, resulting in approximately the same time delay as the source passes over the termination point.

Although there would still be a total variation in time delay of approximately half that of the single fiber ring, the delay is continuous and can be electronically conditioned to remove this variation.

A method of conditioning the data so that it removes the time variation is to reinsert the edges of the data using an external clock source. The time variation is known as bit jitter. The result of jitter is that a bit periods are either longer or shorter than expected. If a single bit period shrinks or expands the receiving system can sample the bit at the wrong time and read an invalid value.

To correct this problem, an external clock is derived and the bit periods are reset to the proper size. The external clock source can either be derived by a phase lock loop that is synchronized to the data stream or a phase lock loop that is synchronized to the data and has a position feedback sensor mounted on the moving part of the system. Using feedback from the moving part of the gantry the jitter introduced from the varying time lag can be removed or averaged out so that data recovery circuits past the slip ring can recover that data. The data edges are reinserted by delaying the data by at least one bit period and then stretching or shrinking the bit period to match the new clock by using a clocked flip-flop circuit.

This type of circuit will remove the all of the jitter introduced from the slip ring and will result in a slow drift of the clock speed corresponding to the rotational speed of the slip ring. Most data recovery circuits can compensate for this slow drift with no further modifications to their circuits.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An optical slip ring system for transferring information between a rotating frame and a stationary frame, comprising:
   a modulated light source attached to the rotating frame for transferring information to the stationary frame;
   an optical fiber ring for receiving modulated light from the modulated light source, the optical fiber ring being attached to the stationary frame, the optical fiber ring including:
     a first optical fiber having a first end and a second end, wherein the first end of the first optical fiber is coupled to a first terminator and the second end of the first optical fiber is coupled to a detector; and
     a second optical fiber having a first end and a second end, wherein the first end of the second optical fiber is coupled to a second terminator and the second end of the second optical fiber is coupled to the detector; and
     a signal conditioner coupled to the detector for removing time variations in the transferred information, wherein the signal conditioner restores data edges of the transferred information using an external clock which is derived from a phase locked loop that is synchronized to both a digital data stream of the transferred information and a position feedback sensor that is mounted on the rotating frame.

2. The optical slip ring system of claim 1, wherein the data edges of the transferred information are restored by delaying the transferred information by at least one bit period and then stretching or shrinking the bit period to match the external clock.

3. The optical slip ring system of claim 1, wherein the detector includes separate detectors coupled to each of the first and second optical fibers.

4. The optical slip ring system of claim 1, wherein the optical fiber ring is retained within a channel in the stationary frame.

5. The optical slip ring system of claim 2, wherein the bit period is stretched or shrunk to match the external clock by utilizing a flip-flop clocked by the external clock.

6. An optical slip ring system for transferring information between a rotating frame and a stationary frame, comprising:
   a modulated light source attached to the stationary frame for transferring information to the rotating frame; and
   an optical fiber ring for receiving modulated light from the modulated light source, the optical fiber ring being attached to the rotating frame, the optical fiber ring including:
     a first optical fiber having a first end and a second end, wherein the first end of the first optical fiber is coupled to a first terminator and the second end of the first optical fiber is coupled to a detector;
     a second optical fiber having a first end and a second end, wherein the first end of the second optical fiber is coupled to a second terminator and the second end of the second optical fiber is coupled to the detector; and
     a signal conditioner coupled to the detector for removing time variations in the transferred information, wherein the signal conditioner restores data edges of the transferred information using an external clock which is derived from a phase locked loop that is synchronized to both a digital data stream of the transferred information and a position feedback sensor that is mounted on the rotating frame.

7. The optical slip ring system of claim 6, wherein the data edges of the transferred information are restored by delaying the transferred information by at least one bit period and then stretching or shrinking the bit period to match the external clock.

8. The optical slip ring system of claim 6, wherein the detector includes separate detectors coupled to each of the first and second optical fibers.

9. The optical slip ring system of claim 6, wherein the optical fiber ring is retained within a channel in the rotating frame.

10. The optical slip ring system of claim 7, wherein the bit period is stretched or shrunk to match the external clock by utilizing a flip-flop clocked by the external clock.

11. A method of compensating for time delay of a received signal in an optical slip ring, comprising the steps of:
   splitting the optical slip ring into two approximately equal lengths so as to reduce discontinuity in the time delay of the received signal; and
   restoring data edges of the received signal using an external clock which is derived from a phase locked loop that is synchronized to both a digital data stream of the transferred information and a position feedback sensor that is mounted on a rotating frame.

12. The method of claim 11, wherein the data edges of the received signal are reinserted by delaying the received signal by at least one bit period and then stretching or shrinking the bit period to match the external clock.

13. The method of claim 12, wherein the bit period is stretched or shrunk to match the external clock by utilizing a flip-flop clocked by the external clock.

* * * * *